United States Patent [19]

Feller

[11] Patent Number: 4,618,266
[45] Date of Patent: Oct. 21, 1986

[54] MEASUREMENT OF ENERGY IN FLOWING FLUID

[75] Inventor: Murray F. Feller, Citrus County, Fla.

[73] Assignee: Wilgood Corporation, Dunnellon, Fla.

[21] Appl. No.: 501,009

[22] Filed: Jun. 3, 1983

[51] Int. Cl.[4] ............................................. G01K 17/06
[52] U.S. Cl. ........................................ 374/41; 374/20; 374/35; 374/39; 374/40; 165/47
[58] Field of Search ................ 374/39, 40, 41, 29, 374/30, 35, 135, 20; 165/47, 104.21

[56] References Cited

U.S. PATENT DOCUMENTS

| | | | |
|---|---|---|---|
| 2,633,749 | 4/1953 | Lindström | 371/41 |
| 2,633,749 | 4/1985 | Lindström | 374/41 |
| 2,958,021 | 10/1960 | Cornelison et al. | 165/104.21 |
| 3,204,447 | 9/1965 | Krause et al. | 374/35 |
| 3,267,726 | 8/1966 | Sellers, Jr. | 374/30 |
| 3,382,313 | 5/1968 | Argello | 165/104.21 |
| 4,085,613 | 4/1978 | Richard | 374/39 |
| 4,306,453 | 12/1981 | Wolfshorndl | 73/204 |
| 4,355,908 | 10/1982 | Weissen et al. | 374/39 |

Primary Examiner—Charles Frankfort
Assistant Examiner—Thomas B. Will

[57] ABSTRACT

Energy transmitted to a load in a fluid medium is measured utilizing a probe having an elongate heat transmitter that includes a sensing tip at one end, a heat exchanger at its opposite end, a thermal impedance forming at least a segment of the heat transmitter, and temperature sensors spaced apart along the impedance. The temperature of the sensing tip is maintained different from that of the sensed fluid. A read-out is responsive to the temperature sensors and it is calibrated in terms of the energy content of the fluid flowing in the sensed passage. Corrections for various factors of error are incorporated in the read-out. A relative simple yet reasonably accurate measure is made of the energy in steam, where the heat exchanger of the probe is a passive heat dissipator. By controlling the heat exchanger so as to maintain the sensing tip at the temperature of the fluid in a reference condition, measurement of the energy content of the fluid in another condition is made, this being applicable not only to steam systems but also to forced air heating and cooling systems as well as circulating liquid heating and cooling systems.

26 Claims, 15 Drawing Figures

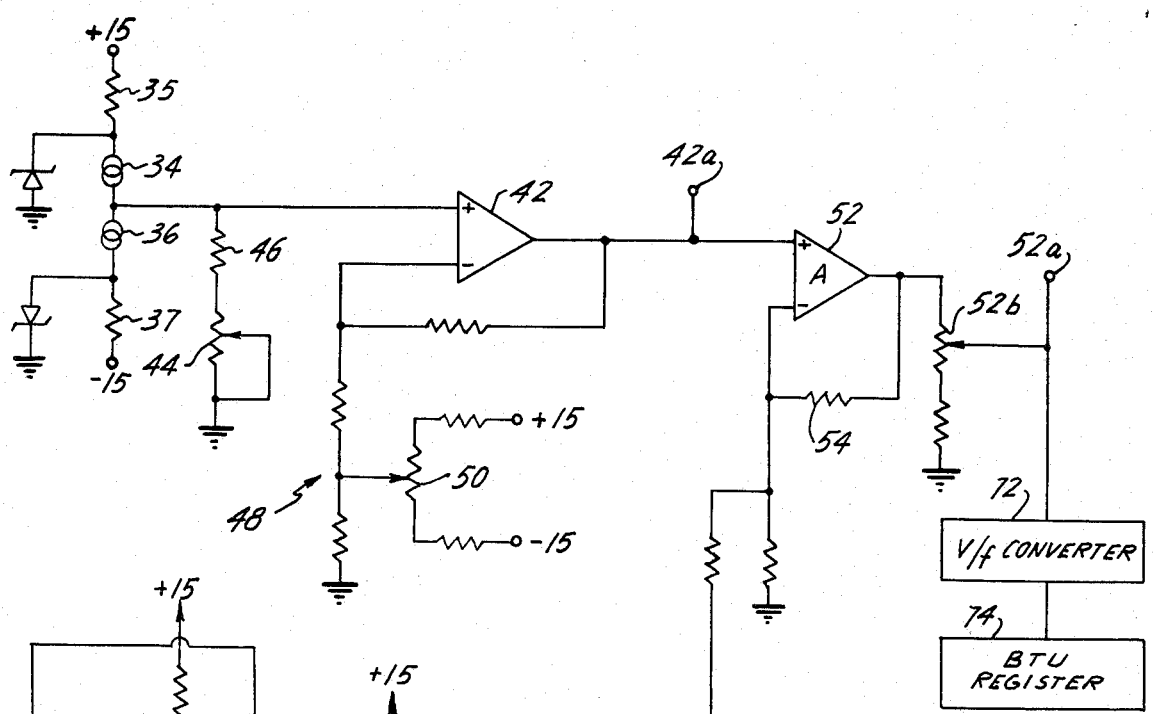
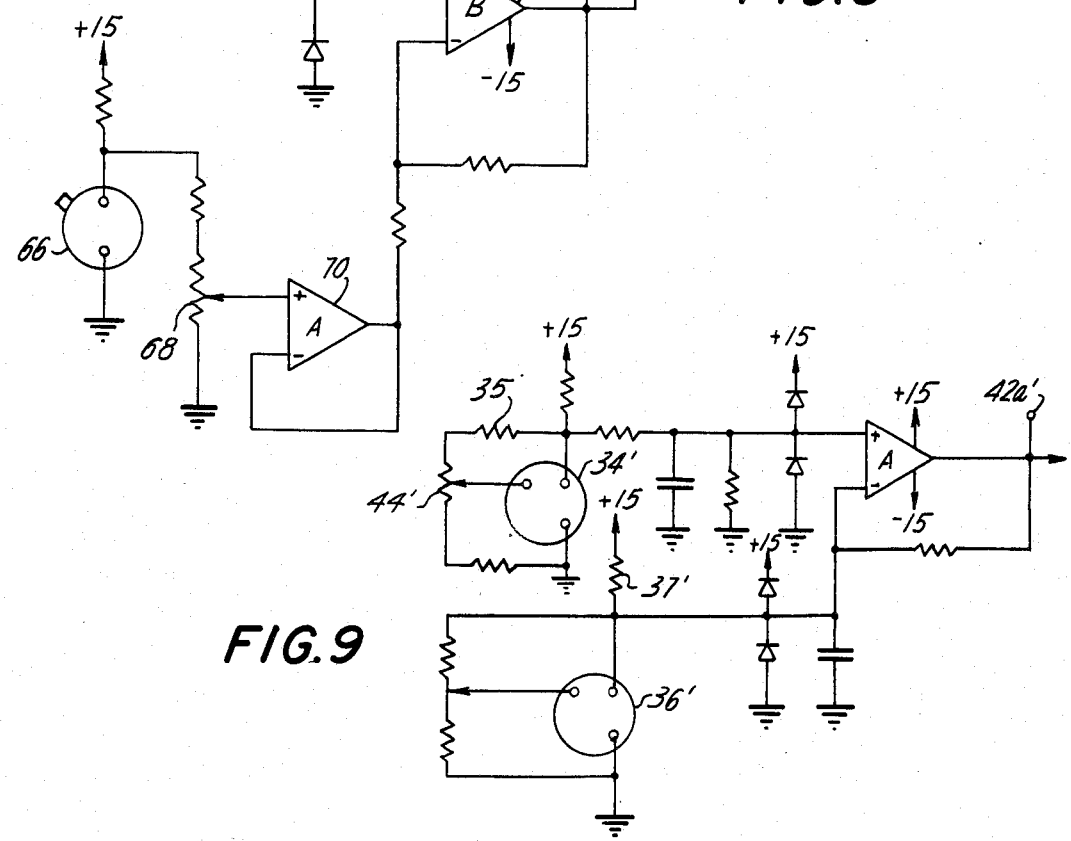
FIG.8
FIG.9

MEASUREMENT OF ENERGY IN FLOWING FLUID

The present invention relates to apparatus and methods for measuring the energy transferred to a load by a fluid medium, and in particular to such transfer where steam or the like is the transfer medium.

The measurement of energy in steam flowing to a load may be performed in a routine fashion by supplying input signals to a computer representing the volume-rate and the temperature and pressure of the steam. See "Microprocessor controller computes steam flow", *Instruments and Control Systems,* October 1980 at page 82. A sensor is required for each of the factors plus a computer, all of which entails significant cost and complexity. Suitable flow sensors commonly include a flow-driven rotor and a rotation sensor that produces a train of flow-representing pulses. Where steam is involved, the flow sensors must be fabricated to withstand high temperatures, and they may require frequent inspection and reconditioning.

In common with liquid as an energy transfer medium, the energy in steam includes the heat needed to raise the water to the operating point, the boiling point in the case of steam. In common with air as the transfer medium, the energy in steam includes the energy needed to raise the steam temperature from the boiling point to the operating temperature. However with steam there is a third and dominate factor, its latent heat of vaporization or condensation. Pursuant to one aspect of the invention, a novel heat measuring method and apparatus are provided for steam and like fluids that respond to the stored energy in the steam, taking into account the specific heat of steam and its superheat (if any), and its latent heat, and much of the energy represented by the heat required to raise the water or other liquid to its boiling point. To the extent that this last factor is not dealt with rigorously in a preferred form of novel heat meter, measurement of the total transferred energy is not precise. However, since all factors are represented in the measurement including the dominant factor of latent heat, a high order of accuracy is realized.

In this aspect of the invention, the sensing tip of a probe is exposed to the steam. An elongated heat transmitter conducts the heat from the sensing tip to an energy absorber. An exemplary form of energy absorber is a finned heat dissipator that is cooled by radiation and by convection air currents, here called a "passive heat dissipator". The area of the sensing tip that is exposed to absorption of heat is limited and it is so related to the passive heat dissipator that the sensing tip remains below the steam condensation temperature up to the maximum rate of the measurement range.

The heat absorbed by the sensing tip is a direct, nearly linear function of the steam velocity. The absorbed heat includes factors representing the superheat energy in the steam and the latent heat of the steam condensed at the sensing tip, and the heat extracted from the condensate in reducing its temperature from the boiling point to the lower temperature of the sensing tip. Where a passive heat dissipator is used, this last factor is only an approximation of the energy needed to raise the water from its starting temperature to its boiling point. The absorbed heat is conducted to the heat dissipator along a heat transmitter that incorporates a linear thermal impedance, i.e., a heat conductor in which the drop or rise of temperature along its length is proportional to the rate of heat flow along its length. A pair of temperature sensors spaced apart along this thermal impedance provide a measure of the heat absorbed by the sensing tip.

A read-out converts the differential sensor output into heat units, to provide both a rate-of-heat flow reading and a cumulative heat register of heat units. The read-out incorporates any desired correction for non-linearity in the variation of the differential sensor output versus the heat in the flowing steam. Correction may be provided for the limited amount of heat absorbed by the probe at zero flow rate, as an off-set from the response curve of the differential sensor output.

The read-out is calibrated so as to take into account both the intrinsic heat absorption of the sensing tip at different flow rates and the relationship of the small sample of steam that is condensed by the sensing tip of the probe versus the cross-sectional area of the steam conduit. A signal is developed that represents the rate of energy flow. This signal is converted by a voltage-to-frequency generator into a series of pulses that are counted in a BTU register to maintain an accumulated account of the delivered heat.

The linear thermal impedance is here made short to avoid pick-up and loss of heat along its length. It is also made of high thermal conductivity metal in order to minimize the thermal drop along the probe. This provision helps to limit the rise in temperature of the sensing tip as it absorbs greater amounts of heat at higher steam (and energy) flow rates.

The elongated heat transmitter between the sensing tip and the heat dissipator (which includes the linear thermal impedance) enables the heat dissipator to be spaced away from the steam conduit. A significant thermal drop could develop along its length. Instead of a simple heat conductor where such elongation is needed, a heat pipe serves as part of the heat transmitter, for minimizing the thermal drop along the heat-pipe segment of the elongated heat transmitter to a very small value. A low thermal drop that develops along the heat transmitter is advantageous in minimizing the temperature rise of the sensing tip which tends to occur at high rates of energy flow.

The energy measuring apparatus which relies on a passive heat dissipator necessarily develops a rising temperature at the sensing tip of the probe with increasing flow rate of the fluid that is sensed. The amount of the temperature rise can be limited by resorting to ever larger passive heat dissipators. Obviously that course has its limits in practice. Where the temperature of the heat dissipator varies with increases in fluid flow rate, the temperature of the sensing tip increases correspondingly. A correction is optionally provided for that factor. A variable-gain amplifier (described below) is itself a feature of the invention, and is of special advantage for introducing that correction and others.

As a further feature of the invention, a controlled heat exchanger may be provided in place of the passive heat dissipator discussed above, such as a variable-speed blower added to a finned heat radiator. A thermoelectric cooler is exemplary for the purpose. Rigorous measurements of heat flow of the fluid can be made, taking into account (as one factor in the case of steam) a reference temperature. This may be the temperature of the condensate at the load, to reflect the energy absorbed by the load; or the reference temperature may be the temperature of the boiler feed-water to reflect the full cost of supplying the heat to the load. The condensate may at times be the boiler feed-water, so that there would be but one reference temperature. The sensing tip is maintained at the low reference temperature by controlling the heat exchanger, so that the heat absorbed by the sensing tip can represent quite rigorously all the factors of the heat in the steam.

In accordance with a further aspect of the invention, a novel heat flow measuring method and apparatus are provided that are useful not only for the measurement of energy flow of steam but also for heating systems using forced air or circulating liquid. The steam-measuring apparatus outlined above, in which a heat exchanger is controlled to maintain the sensing tip of a probe at a reference temperature, is a special case of this aspect of the invention.

Control of the heat exchanger is also useful in systems for delivering cooled liquid to a load and in systems for delivering cooled and dehumidified air to a load as in air-conditioning systems. It is feasible to use a probe with a controlled heat dissipator even in systems where the fluid is cooled. The reference temperature at which the sensing tip is maintained can then be the cooled air or liquid, and the sensing tip of the probe is then exposed to the warm liquid or the warm and humid air that enters the cooling coils. In forced-air cooling systems, the sensing tip serves to extract both the heat added to the air in the cooled environment and the heat of condensation of the humidity extracted by the sensing tip. The probe acts somewhat as a small replica of the cooling coils.

As a still further aspect of the invention, performance of a heating system can be monitored in a related manner. The controlled heat exchangers of the sensing probe thus far considered are a form of a heat absorber at one end of the probe. Each controlled heat exchanger is operated in a manner that maintains the sensing tip of the probe at a reference temperature. In a forced air heating system, a probe having a sensing tip exposed to the cool air leaving the heated space can be operated at the controlled reference temperature of the heated air entering the heated space. In this case, the heat exchanger that is used for controlling the sensing-tip temperature is not a controlled heat absorber but, rather, it is a controlled electric heater. The sensing tip in the probe is cooled by the fluid flow, not heated as in the systems previously discussed.

In each instance where the probe is exposed to heat-exchange with the flowing fluid, the read-out is calibrated in respect to its response to varying flow rates and temperature change of the fluid from a reference temperature; and the read-out is also calibrated to provide output readings of rate of energy transfer and of accumulated or accrued energy transfer, taking into account the cross-sectional area of the monitored conduit.

The foregoing and other novel aspects of the invention and their advantages will be better appreciated from the following detailed description of several illustrative embodiments and from the accompanying drawings.

In the drawings:

FIG. 8 is a wiring diagram of a read-out for any of the probes of FIGS. 1, 2 and 4–7;

FIG. 9 is a modification of a portion of FIG. 8 adapted to the probe of FIG. 3;

BASIC STEAM METER

Figure 1:
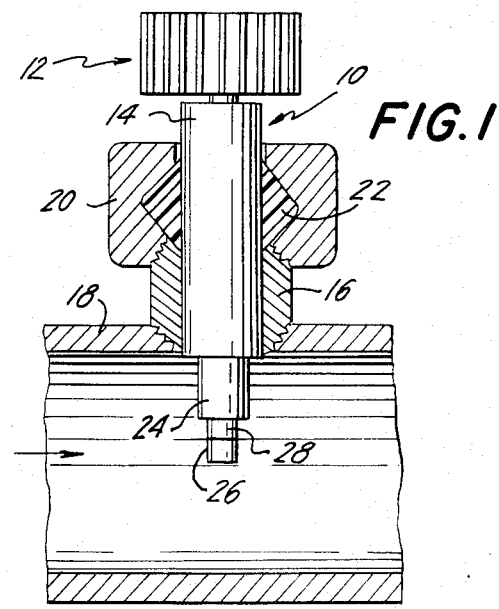
FIG. 1 is an elevation, largely in cross-section, of a sensing probe and a conduit that defines a steam passage to a load (not shown)

In FIG. 1 there is a heat absorber 12 at one end of probe 10. This probe operates successfully with a finned radiator as the heat absorber. It relies wholly on radiation and convection air current to dissipate heat, so that it may be called a "passive" heat dissipator. Forced-air cooling and water-cooled heat absorbers are more complicated but may be used if warranted. They are also passive heat dissipators when operated constantly. An exemplary form of heat absorber where temperature regulation is required is a thermoelectric cooler.

Along its major length, probe 10 has an outer shell 14 as of stainless steel. This shell extends through a mount, such as that in FIG. 1. The mount shown comprises short nipple 16 having one end threaded into pipe or conduit 18. The opposite end of nipple 16 is threaded into clamping ring 20. Gasket 22 as of synthetic rubber or a compression brass ring is captive in clamping ring 20, and one end of the gasket bears against nipple 16. When the clamping ring is tightened onto nipple 16, gasket 22 is squeezed against cylindrical shell 14, sealing the interior of the probe against escape of steam from conduit 18.

Figure 2:
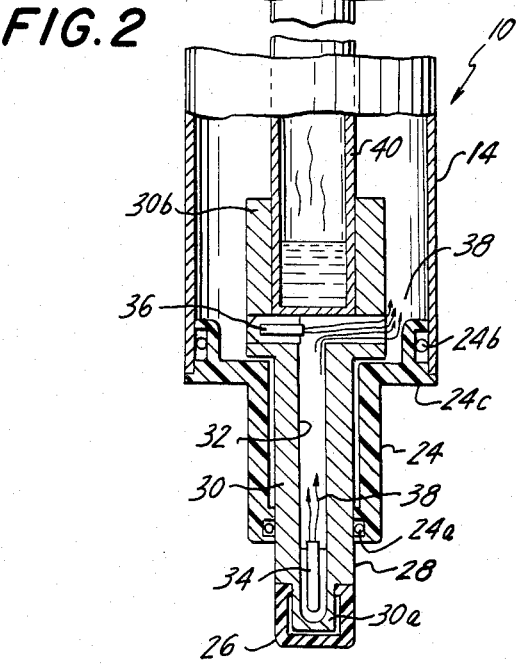
FIG. 2 is an enlarged elevation, largely in cross-section, of the probe in FIG. 1.

Probe 10 has a portion extending well into conduit 18. Most of the inward projecting portion of probe 10 has a sheath 24 of heat insulation. In the form of FIGS. 1 and 2 the probe has a cap 26 of heat insulation. Between the sheath and the cap, a metal part 28 of the probe represents a small heat-exchange area exposed to the steam. It extracts heat from the flowing steam, and it constitutes the "sensing tip" of the probe. Gasketed portions 24a and 24b of the sheath seal the probe against escape of steam to the interior of shell 14.

Figure 4:
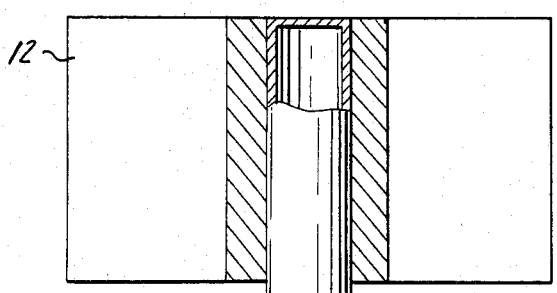
FIGS. 3 and 4 are fragmentary elevations of modifications of the probe in FIG. 2.
Figure 3:
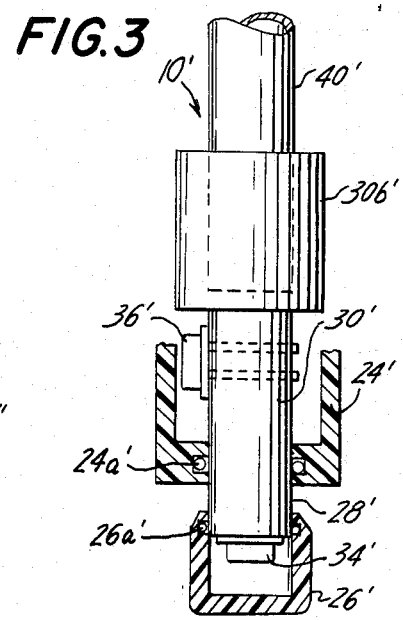

Probe 10 (FIG. 2) and the modifications in FIGS. 3 and 4 exemplify certain distinctive aspects of the invention. The exposed part 28 of the probe is actually a portion of member 30 that is made of metal, especially metal of high thermal conductivity, copper being well suited for the purpose. As will be seen below, exposed part 28 and heat conductor 30 may be spaced-apart elements in an alternative form of probe. Member 30 has a small projecting portion 30a that extends from exposed part 28. Sheath 24 and cap 26 are of polysulfone or other heat insulation that withstands the heat and pressure of the steam, leaving the defined portion 28 directly exposed to the steam. Member 30 has a central bore 32 that is closed at its end within cap 26. Temperature sensor 34 is enclosed partially in part 28 and partially in end portion 30a of member 30. Because portion 30a does not radiate heat and cap 26 prevents appreciable pick-up heat, portion 30a assumes essentially the same temperature as that of part 28. Therefore, the whole sensor 34 is exposed to an essentially uniform temperature. For example, sensor 34 may be an electrically insulated bimetal thermal junction or a temperature-variable resistor. A semiconductor temperature sensor in an integrated circuit such as Type AD590JF or LM235AH is preferred. The type AD590JF temperature sensor is shown in FIGS. 2 and 4, and type LM235AH temperature sensor is shown in FIG. 3.

At its opposite end, member 30 has an enlargement, formed as a cup 30b. A second temperature sensor 36 is mounted in a bore in member 30 adjacent cup 30b. Temperature sensors 34 and 36 should be of the same type and should be matched for tracking of their temperature/output characteristic over the temperature range involved. Wires 38 projecting from sensors 34 and 36 extend within shell 14 to a portion of the probe remote from its sensing tip, emerging outside the probe near heat dissipator 12 and remote from sensing tip 28.

A heat pipe 40 has a tight fit in cup 30b and may even be soldered in place for most effective transfer of heat from member 30. Heat pipes are commercially available components that are used for a variety of purposes such as transferring heat from selected portions of a die-casting mold, etc. A heat pipe consists of a tube that is closed at its ends, and contains a liquid whose boiling point is chosen for the application. The liquid of heat pipes may be water, methanol or freon, for example; and the boiling point of the liquid in any particular heat pipe may be modified by sealing the device at a chosen partial pressure or at an above-atmospheric pressure. The liquid boils in the heated lower end of the heat pipe and the vapor condenses in the cooled upper end. The typical specification for the end-to-end temperature difference in operation when transferring heat at the maximum rating is one degree C.

Heat pipe 40 extends upward from member 30. The liquid that is to boil drops to the lower end of heat-pipe 40 in cup 30b. Heat dissipator 12 is a multiple-vane unit that dissipates heat to the ambient atmosphere by radiation and convection. It is united to the heat pipe by having a tight fit, preferably soldered, for efficient heat transfer.

The space in shell 14 surrounding heat pipe 40 is filled with thermal insulation, and the shell is mounted on heat pipe 40 at each end by flanges of heat insulation. One such flange 24c is shown, being a portion of sheath 24. Shell 14 serves largely a mechanical function. The insulation that separates the shell from the heat pipe is a refinement, serving primarily to prevent any heat that may leave the wall of conduit 10 from affecting member 30 and sensor 36. Accordingly, the heat transmitted by heat pipe 40 is limited to that which is provided by member 30.

In operation, a sample of the steam flowing along conduit 18 condenses on the exposed heat-exchange surface of part 28, the sensing tip. The exposed area is limited in relation to other parameters of the probe so that, at the maximum flow rate of the steam, the sensing tip must remain below—preferably well below—the condensation temperature. It follows that the amount of heat absorbed by the sensing tip must be removed by dissipator 12 from elongated heat transmitting unit 30, 40. The temperature of sensing tip 28 depends largely on the effectiveness with which heat dissipator 12 dissipates the heat absorbed by the sensing tip to the ambient atmosphere. The thermal drop along heat transmitter 30, 40 is small even at the maximum flow rate of the steam.

Heat dissipator 12 is chosen for ample dissipation capacity. It is to maintain the sensing tip below—preferably well below—the steam condensation point of steam at the maximum rate of heat absorption at the tip, i.e. at the maximum flow rate to be monitored. Heat pipe 40 is proportioned to remain operative (condensed liquid available at its heated end) at the maximum steam flow rate to be monitored; and thermal impedance 30 is proportioned (in length and cross-section and specific heat conductivity) for maintaining a reasonable thermal difference between its extremities at maximum flow rate. The thermal drop in member 30 along its length should be held low to avoid contributing unnecessarily to the temperature rise of tip 28 at the maximum steam flow rate to be monitored, while the thermal drop along member 30 should be large enough for temperature sensors 34 and 36 to produce accurate output representing the steam flow, from virtually zero to maximum flow rate. As a minimum criterion, the exposed heat-receiving part 28 and the other parameters of the probe that determine the dissipation of the heat absorbed at the tip are all related to assure the tip 28 being well below the condensation temperature of the steam, at the maximum flow rate of the steam. Consistent with meeting this requirement, there can be further reduction of the thermal drop along unit 30, 40, and the capacity of heat dissipator 12 can be increased, for maintaining tip 28 at still lower temperatures.

The heat extracted by exposed part 28 in condensing and cooling a quantity of steam includes: (1) the heat represented by the quantity of steam that condenses and the specific heat of steam, multiplied by the number of degrees of superheat (if any), and (2) the latent heat of the condensed steam, and (3) the heat represented by the quantity of the condensate at exposed part 28 and the specific heat of water, multiplied by the difference between the condensation point and the lower temperature of part 28. These factors of the energy in the steam flowing past sensing tip 28 are all reflected by the heat absorbed by the sensing tip. The latent heat of the steam is by far the largest factor in the total. Perhaps because of this circumstance, the heat absorbed by the sensing tip is nearly a linear function of the steam velocity.

The energy in the steam that is chargeable to the load is the sum of the heat in the steam (if superheated) and the latent heat of condensation and the heat represented by the temperature difference between the steam and either the temperature of the boiler feed water or (from another viewpoint) the temperature of the condensate returned by the load. Therefore, only that relatively small amount of heat represented by whatever difference there may be between the temperature of the sensing tip and the temperature of the boiler feed-water or condensate from the load is not represented by the heat absorbed by the sensing tip.

A number of sources of error should be considered. There is an off-set, because at zero flow rate, the probe nevertheless extracts some heat. Additionally a progresssive increase in the temperature of the tip occurs with increases in the rate of heat extraction by sensing tip 28, primarily due to the fact that the temperature of passive heat dissipator 12 rises with increasing amounts of heat that it is required to dissipate. Additionally (as already noted), the portion of the energy supplied to the load which is represented by the temperature of the sensing tip above the temperature of the load's condensate or of the boiler's feed-water is not represented in the heat that is absorbed by the sensing tip. These factors, separately, might be regarded as minor departures from proportionality of heat-absorption by the sensing tip versus steam-velocity. For some purposes, the heat absorption at the tip may be treated as a suitably accurate measure of steam-flow energy. Each of these (and other) factors of error can be largely compensated in the readout circuit (see below) if improved accuracy is required.

The rate at which heat is extracted from the steam by the sensing tip is converted into a temperature drop along linear thermal impedance 30. That thermal drop is converted into electrical output from sensors 34 and 36. The readout circuit develops a voltage-difference signal that represents the rate of heat extraction by the sensing tip 28. The rate of energy transmitted by the steam along conduit 18 can be read out, including a multiplying factor representing various cross-sections of the conduit. Finally, the rate signal can be integrated in the read out, for registering the transmitted energy over a period of time.

Practical use of the probe of FIG. 2 demonstrates performance with a comparatively high degree of accuracy. In an example of that probe, part 28 has an exposed length of 0.050 inch and a diameter of 0.25 inch; and the length of thermal impedance 30 to cup 30b is 0.60 inch, including sensing tip 28 but omitting portion 30a. At maximum flow rate of 240° F. (120° C.) steam, tip 28 reaches approximately 80° C., there is a 1° C. drop from end to end of pipe 40, and a 10° C. drop develops along thermal impedance 30 from sensor 34 to sensor 36. The temperature of dissipator 12 is therefore about 69° C. at the maximum flow rate and about 49° C. above the 20° C. ambient.

FIG. 3 shows a modified form of probe interior, using a Type LM235AH temperature sensor shaped somewhat like a flanged pill-box. Corresponding parts in FIGS. 2 and 3 bear the same numerals but those in FIG. 3 are primed. Insulating cap 26' has a sloping margin where it ends at sensing part 28', to promote run-off of the condensate. Cap 26' has a seal 26a' to prevent steam from reaching sensor 34', to prevent moisture from reaching and harming the bond of sensor 34' to member 30', and to prevent escape of steam via the bore in member 30'. The further description of the probe in FIG. 2, and its operation, apply fully to FIG. 3.

FIG. 4 shows a further modification of the probe of FIG. 2, the corresponding elements of both figures bearing the same numerals, distinguished in FIG. 4 by (''). The probe of FIG. 4 omits cap 26 of FIG. 2; but its sensor 34'' extends along the high-thermal-conductivity member 28'', 30'' so that a small temperature gradient develops along the length of the sensor.

Figure 5:
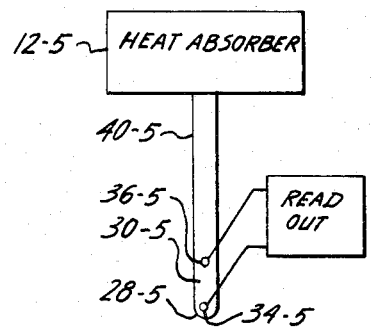
FIGS. 5, 6 and 7 are diagrammatic representations of various additional modifications of the probe in FIG. 2.
Figure 6:
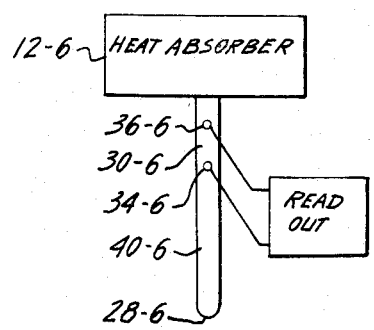
Figure 7:
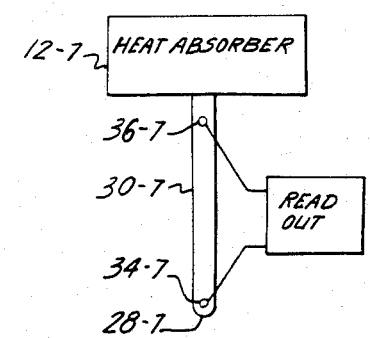

Before discussing the read-out circuit, it may be helpful to review various alternative positions of the temperature sensors in the steam-flow probe, as represented in FIGS. 5–7. Elements in FIGS. 5–7 corresponding to those in FIG. 2 bear the same numerals, with distinguishing suffixes "-5", "-6" and "-7".

FIG. 5 shows a probe similar or even identical to that in FIG. 2. Thus, linear thermal impedance 30-5 develops a temperature at sensing tip 28-5 resulting from exposure to transversely flowing steam. The tip temperature is the same as the temperature of the warmer end of thermal impedance 30-5, and it is sensed by sensor 34-5. A second sensor 36-5 spaced from tip 28-5 senses the temperature at the low-temperature end of thermal impedance 30-5. Heat-transmitting segment 40-5 might be a thermal conductor but, where it is a heat pipe, there is very little thermal drop between cup 30b and heat dissipator 12. In an example, heat pipe 40 is six inches long. This allows space between pipe 18 and heat dissipator 12 for thermal insulation around pipe 18 and space for free flow of cooling air past the heat dissipator.

In the modification of FIG. 6, the linear thermal impedance 30-6 and temperature sensors 34-6 and 36-6 at its extremities are spaced from sensing tip 28-6 and close to heat absorber 12-6. Heat transmitting segment 40-6, especially the heat-pipe form of heat-transmitting segment, is interposed between sensing tip 28-6 and the high-temperature end of thermal impedance 30-6. As in FIGS. 2 and 5, segment 40-6 ideally is a heat pipe. The heat-transmitting unit 40-6 is exposed to stray heat pick-up and heat-loss (even with heat-protective insulation) that could introduce error.

In FIG. 7, the heat pipe is omitted and thermal impedance 30-7 of high-conductivity metal, e.g. copper, extends along or replaces the whole heat-transmitting unit 30, 40 of FIG. 2. Thermal impedance 30-7 is much longer than thermal impedance 30, so that the temperature difference between its extremities might become prohibitively large. To avoid that condition, the cross-section of member 30-7 may be enlarged compared to member 30. The resulting extended surface area of member 30-7 tends to expose thermal impedance member 30-7 to spurious pick-up and loss of heat (despite a wrapping of thermal insulation), impairing the accuracy of the measurements.

BASIC READ-OUT CIRCUIT

FIG. 8 is the wiring diagram of a read-out that may be used with the probe of FIG. 2, using Type AD590JF integrated circuit devices as temperature sensors 34 and 36. Their characteristics should be tested for accurate tracking. These sensors and respective resistors 35 and 37 are connected in series between (+) and (−) d-c terminals. Their junction is connected to the (+) input of an operational amplifier 42 whose gain can be adjusted by trimmer 44 in series with fixed resistor 46, connected as shown. A resistor network 48 connected to the (−) input of amplifier 42 and to the (+) and (−) d-c terminals includes potentiometer 50. The bias for this (−) input is set by adjusting potentiometer 50 so that amplifier 42 has zero output when sensors 34 and 36 are at the same temperature. The output of amplifier 42 at terminal 42a is a d-c voltage that represents the temperature difference between sensors 34 and 36.

The output of amplifier 42 is connected to the (+) input of amplifier 52. The output of amplifier 52 is a d-c voltage that represents the energy flow rate of the steam in conduit 18. Potentiometer 52b adjusts the output to a desired value at a known steam-energy flow rate, for calibration. A feedback path 54 to the (−) input of amplifier 52 adjusts the gain of amplifier 52. Where precision is required, feedback resistor 54 takes the form of a non-linear resistive network designed to modify the amplifier's characteristic in relation to the differential output of sensors 34, 36 so that the output at terminal 52a varies linearly with rate of transmission of energy in the steam at various values over the range to be monitored.

When the steam velocity is essentially nil, sensing tip 28 is nonetheless exposed to the high temperature of the steam that fills the conduit 18. Sensing tip 28 extracts very little heat in that condition. However, it does extract some heat, and the output of sensors 34 and 36 and of amplifiers 42 and 52 would then provide a small false indication of heat transmission to the load. Indeed, this factor causes an "off-set" in the output characteristic at various levels. Moreover, a correction for the slope of the offset factor may warrant fine adjustment over the range of steam velocities to be monitored. The following circuit feature is provided for those purposes.

Temperature sensor 56 such as a type LM235H integrated-circuit component is mounted on the steam pipe 18 or in the steam passage but shielded against velocity effects of the steam so that it responds only to the steam temperature. Its temperature-representing d-c output is coupled via potentiometer 58 and R-C filter 60, 62 to the (+) input of operational amplifier 64. The output at terminal 64a is a d-c voltage that is provided as a correction for "off-set" in the heating of sensing tip 28. As shown, that output is impressed on the (−) input of amplifier 52, as a factor subtracted (in effect) from the input to the (+) input.

A semiconductor device 66, e.g. type LM329DH, provides a d-c output that is coupled to the (−) input of amplifier 64, to balance the ambient-temperature portion of the output of sensor 56. Potentiometer 68 is an adjustment for this factor. Amplifier 70 provides unity-gain coupling.

FIG. 9 is a modification of a portion of the circuit in FIG. 8, useful when sensors 34 and 36 are type LM235AH as in the form of probe in FIG. 3. Primed numerals are used for components in FIG. 9 corresponding to like parts in FIG. 8. The description (above) of FIG. 8 applies to FIG. 9.

The output at terminal 52a in FIG. 8 represents the rate of heat transmission to the load, as noted above. This is applied to a voltage-to-frequency converter 72 whose output to counter 74 provides a cumulative reading of delivered heat units. The rate reading of an instrument connected to terminal 52a and the register of accumulated heat units 74 are calibrated in a manner that takes into account the cross-section of conduit 18.

ADJUSTED READ-OUT CIRCUIT

The foregoing circuits provide readings of heat-transmission velocity and accumulated heat delivery with ample accuracy for some purposes. Where greater accuracy is desired, additional measurement factors and corrections may be introduced, between amplifiers 42 and 52 as shown in FIG. 10 for example, using a variable gain amplifier 74 for each compensating factor 76a, 76b, etc.

The physical form of probe 10 in FIG. 2, with its passive heat dissipator 12, develops rising temperature of the dissipator above ambient as the steam velocity increases. This effect can be reduced or eliminated by using a thermoelectric cooler as a stabilized-temperature heat absorber, or a greatly over-size passive heat dissipator could be used, or a forced-air cooler may be added to heat dissipator 12, to avoid the consequence of changing temperatures of the dissipator that occur with changing steam velocity. However, introducing a circuit correction as in FIG. 10 for that factor is more economical. Sensor 34 or 36 could be used as a control for such a correction.

The energy supplied to a load may be metered and used in billing the user, based in part on the temperature of the returned condensate. A sensor in the condensate line or in the boiler feed-water line may be used in input 76a (FIG. 10) to take into account the temperature of either line.

Figure 10:
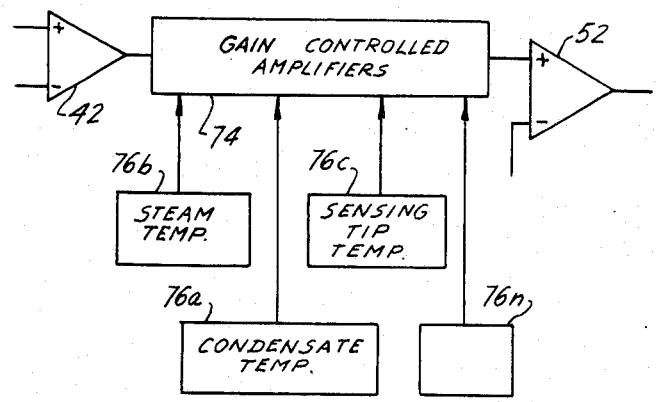
FIG. 10 is a block diagram of a circuit addition for the read-out of FIG. 8.

The temperature of the steam (input 76b) and the ambient temperature about heat dissipator 12 are still further factors that might be taken into account in improving the accuracy of the readings, all as indicated in FIG. 10.

Figure 11:
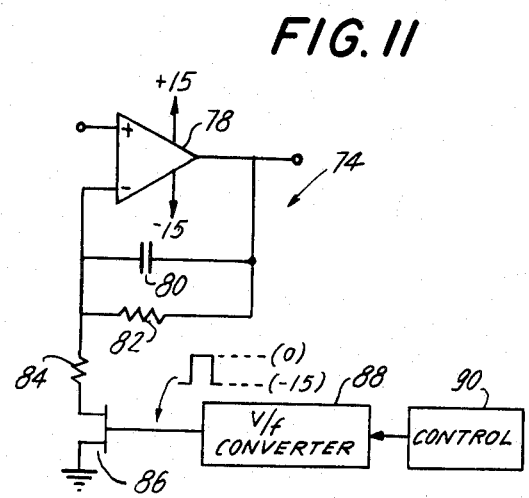
FIGS. 11 and 12 are wiring diagrams of two forms of a gain-controlled amplifier useful in the circuit apparatus of FIG. 10.

FIG. 11 shows a variable-gain amplifier that may be used for any of the corrections in FIG. 8, pursuant to FIG. 10. Operational amplifier 78 (for example, one-half of two-section amplifier type LM358) is used in circuit 74 of FIG. 10. The output signal from amplifier 42 is connected to the (+) input of amplifier 78. A negative feedback loop comprising capacitor 80 and resistor 82 is connected to the (−) input. The ground connection for the (−) input includes resistor 84 in series with a switching device 86 such as FET transistor Type 2N5638. Voltage-to-frequency converter 88 provides square-wave input to the gate of device 86, providing constant-width input signals whose repetition rate is determined by input control 90 to V/f converter 88. This input, for example a temperature-representing voltage, is to modify the output of amplifier 42 variably at different temperatures or for other factors.

Amplifier 78 has high open-circuit gain. When resistor 84 is grounded by closing switching device 86, the output is: A $[R_{82}+R_{84})/R_{84}]$. $V_{in}$, where A is the open-circuit gain. When switching device 86 is open, the output is: $A \cdot V_{in}$. If the switching is repeated rapidly, capacitor 80 establishes an averaged feedback voltage to the (−) input, representing the input signal to device 90.

In an example, the frequency of V/f converter 88 may vary from 100 Hz to 10 kHz, giving a duty-cycle of 0.7% to 70% for a pulse-width of 70 u sec. At 100 Hz, the gain of amplifier 78 is $(143+100)/143=1.7$, where resistors 84 and 82 are 143k and 100k, respectively. At 1 kHz, the gain is 8.0. At 10 kHz, the gain is 71.

In operation, the output signal of amplifier 42 represents the temperature difference between sensors 34 and 36, and that output is variably adjusted by amplifier 78 in dependence on the adjustment factor represented by control 90.

Figure 12:
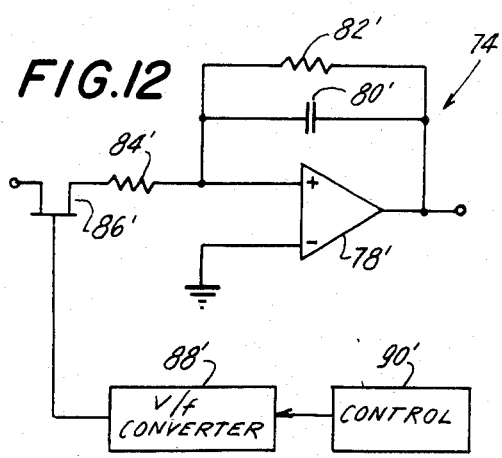

FIG. 12 is an alternative to the circuit of FIG. 11, the components in FIG. 12 bearing primed numerals corresponding to those of FIG. 11. The operation is similar. The gain is linearly proportional to $R_{82'}/R_{84}$, with the switching device closed. The gain varies almost linearly with the duty cycle of the control pulses.

The variable-gain amplifiers of FIGS. 11 and 12 are distinctive devices for introducing modifications in the output signal of amplifier 42, or at other suitable parts of the circuit of FIG. 8. Other devices for introducing modifying factors may be warranted. However, as already noted, the probe of FIG. 2 and the circuit of FIG. 8 provide measurements that are quite useful in some circumstances. The adjustments may be important in other circumstances.

MODIFIED HEAT-METER APPARATUS

Figure 13:
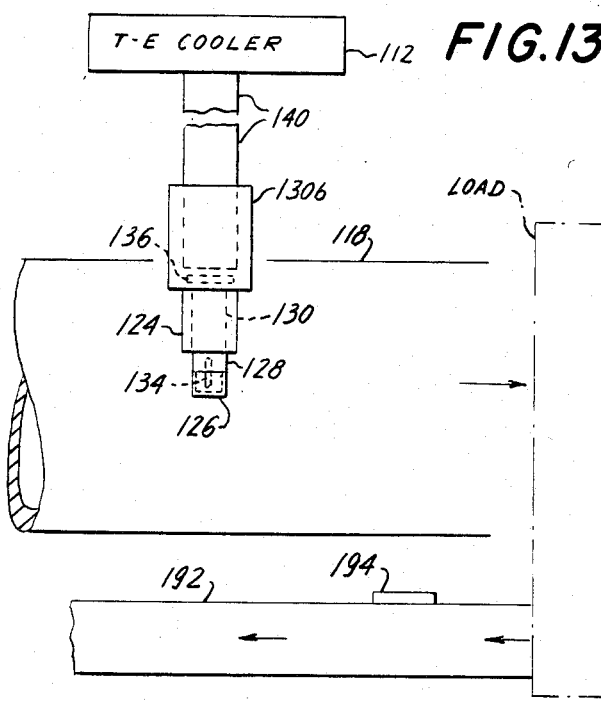
FIG. 13 is a diagram of a steam heating system incorporating a sensing probe typified by FIGS. 1 and 2, this figure also illustrating a forced-air heating system as well as a circulating hot-water heating system.
Figure 14:
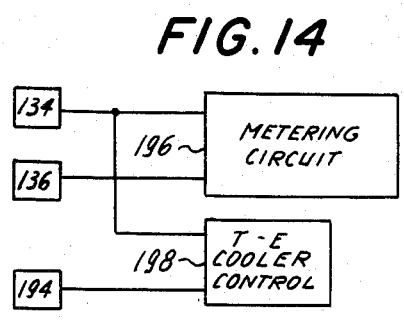
FIG. 14 is a block diagram of a control for the heat exchanger and a read-out for the apparatus in FIG. 13, being a modification of FIG. 8.

FIGS. 13 and 14 are a diagrammatic representation of the apparatus of FIGS. 1, 2 and 8, including appropriate corrections of FIG. 10. However, the embodiment of FIGS. 13 and 14 is modified to provide a more rigorous result of metering the heat provided to a steam load without dependence on a variable temperature or an arbitrarily controlled temperature of the sensing tip 28. Passive heat dissipator 12 of FIG. 2 is replaced by a heat absorber, especially a thermoelectric cooler, that is variably or dynamically controlled. Additionally, a temperature sensor is provided in the condensate line or in the boiler's feed-water line. The circuit of FIG. 14 controls the thermoelectric cooler to maintain the probe's sensing tip at the temperature of the load's condensate or the inlet water to the boiler. Consequently, the differential output of the the sensors in the probe reflects all of the factors in the energy chargeable to the load, including any superheat energy of the steam, the latent heat of the steam, and the energy in the water due to the difference between the steam condensation temperature and the condensate-return temperature or the boiler-feed temperature.

Numerals in FIGS. 13 and 14 of the "100" series are applied to parts corresponding to those in FIGS. 1, 2 and 8, and are described only to the extent of differences introduced in FIGS. 13 and 14. To the extent that corrections may be warranted, the features of FIGS. 10-12 are to be regarded as incorporated in FIGS. 13 and 14, as well as in FIG. 15.

Passive heat absorber 12 is replaced in FIG. 13 by thermoelectric cooler 112, coupled via heat pipe 140 to linear thermal impedance 130. Temperature sensors 134 and 136 are spaced apart along the length of thermal impedance 130. Sensing tip 128 is exposed to the steam flowing in conduit 118 to the "Load", the rest of the probe in conduit 118 being shielded by heat insulators 124 and 126. Aside from the changed heat absorber, the probe in FIG. 13 is the same as in FIG. 2.

Condensate line or boiler feed-water line 192 has a temperature sensor 194, in or on the pipe 192 from the load and/or to the boiler. As in FIG. 8, the tip-temperature sensor 134 and the "low" temperature sensor 136 supply input to the metering circuit 196, being the same as that in FIG. 8. A control circuit 198 for thermoelectric cooler 112 forces cooling of the sensing tip to the temperature of the water in line 192. Control circuit 198 may comprise a suitably biased differential amplifier with its (+) input connected to sensor 194 and with its (−) input connected to tip sensor 134. In this way, the sensing tip performs as a miniature load, and the metering circuit is to be calibrated to register the total heat transmitted to the load. It will normally include a choice of multiplying factors corresponding to different cross-sections of the supply conduct that may be used.

The system described involves maintaining the temperature of the sensing tip at the temperature of the boiler feedwater or of the condensate from the load. Recognizing the small temperature difference between sensors 134 and 136, it would be possible to use sensor 136 in controlling the thermoelectric cooler. The small error that would arise with this change might be acceptable, or a correcting off-set could be introduced in metering circuit 196.

What has been said above concerning a steam heating system applies correspondingly to a closed-loop heating system in which freon or other liquid that boils and condenses is used in place of water. The latent heat of such liquids represents a dominant factor in the energy that is transmitted, so adjustments for secondary factors may be omitted except where high accuracy is needed.

The same kind of apparatus as in FIGS. 13 and 14 can be used for metering heat supplied to a load (such as in heating a residence) using a circulating forced-air heating system or a circulating hot-water system. There is no latent heat factor in such systems, so that the temperature control of the probe's sensing tip provided by controlling the thermoelectric cooler (FIG. 14) has distinct value. It may be contrasted with using a passive heat dissipator for the probe, without compensating adjustments (FIG. 10) for the temperature variations of the heat absorber or for changes in the heating load, or changes in the ambient temperature about the heat absorber.

As a distinctive application, the system of FIGS. 13 and 14 with modifications is useful in air conditioning. The flow-sensing probe is used to sense the inlet air to the cooling coils and the thermoelectric cooler drives the sensing tip to the temperature of the air leaving the cooling coils and ducted to the cooled environment. Temperature sensor 194 of FIGS. 13 and 14 is in the cooled air line and the tip 128 of FIG. 13 is be disposed in the inlet air passage to the cooling coils. As in the system of FIG. 13, the probe is upright and it extends downward from the thermoelectric cooler to the sensing tip, for normal operation of the heat pipe. Because of the humidity of the air flowing across the sensing tip (being the same air as that which passes the cooling coils) moisture may well occur on the sensing tip. Accordingly, the energy measured by the apparatus would include not only that involved in reducing the air temperature but also the energy used in condensing moisture out of the air. In this respect, the flow-sensing probe acts like a sample of the cooling coils.

The apparatus of FIGS. 13 and 14, whether applied to forced-air heating or cooling systems or to circulating water heating or cooling systems, can utilize a high thermal conductivity bar in place of the heat pipe, or the thermoelectric cooler could be mounted directly at the low-temperature end of thermal impedance 130. However, where there is a practical requirement for significant spacing between components 112 and 130, the heat pipe is a distinct advantage. Were a long metal bar to replace the heat pipe, thermoelectric cooler 112 would be required to operate—wastefully—at an appreciably lower temperature to account for the thermal drop that would develop along such heat-conducting bar.

Figure 15:
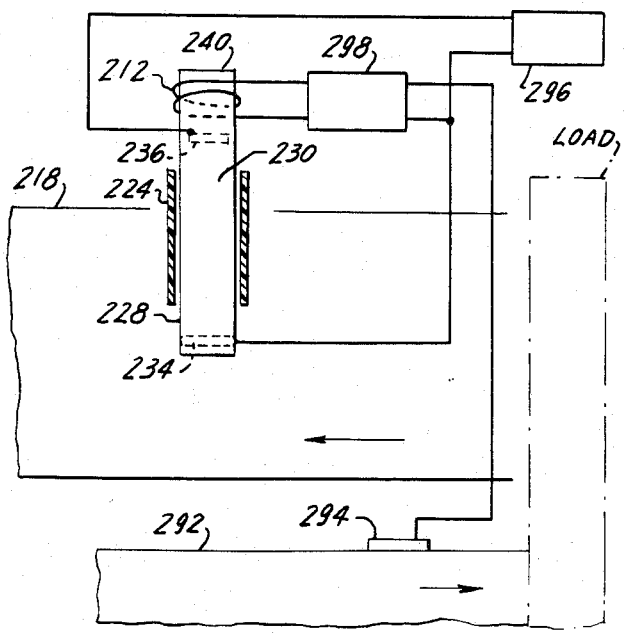
FIG. 15 is a diagram of a heating system and heat-flow monitoring apparatus as a modification of FIGS. 13 and 14.

A further modification of the energy-metering apparatus of FIGS. 13 and 14 is shown in FIG. 15 for monitoring the energy added to the air supplied to a living space ("Load") by a hot air furnace. In FIG. 15 numerals of the "200" series are used to represent components in FIGS. 13 and 14 bearing "100"—series numerals. In FIG. 15, heater 212 replaces the thermoelectric cooler, and the heat pipe of FIG. 13 is omitted.

Temperature sensor 234 responds to the temperature and the mass-flow of air in duct 218 returning to the furnace from the environment to be heated. The relatively cool air in duct 218 extracts heat from sensing tip 228, as a direct function of the mass flow rate and the temperature drop in the Load. An electric heating element 212 serves as a heat-exchanger to heat extension 240 of thermal impedance member 230, a high-conductivity metal bar as of copper. Heat from the heater flows along bar 230, 240 to sensing tip 228, to make up for the heat extracted by the flowing air. Accordingly, the temperature at sensor 236 is ordinarily higher than the temperature at sensor 236, at the tip of the probe.

As in FIGS. 8, 9 and 13, the difference between the output of the sensors is utilized in circuit 296, for developing the desired output, i.e. the cumulative metered heat energy that is supplied and, optionally, the number of heat units being delivered per unit of time. In addition, sensor 294 is provided to sense the temperature of the heated air flowing to the Load. Sensor 294 acts with tip temperature sensor 234 as input to control circuit 298 for maintaining the temperature of sensing tip 238 at the temperature of the air in supply duct 292.

With increased mass-rate of air-flow, sensing tip 238 loses heat at an increasing rate. Correspondingly, with higher temperatures at the supply-duct sensor 294, heater 212 drives up the temperature of the sensing tip with the result that heat is lost at a greater rate from the sensing tip to the low-temperature air in duct. The same result occurs when the supply-duct temperature remains constant and the returned air in duct 218 is chilled for any reason. Since the sensing-tip is maintained at the temperature of the supply-duct air, the heat extracted by sensing tip 228 represents the combined effects of air velocity and the temperature difference between the supply and return ducts. The extracted heat flows along linear thermal impedance 230, causing a drop in temperature from sensor 236 to sensor 234. The output of the sensors is converted by appropriately calibrating register 296 into units of heat supplied to the circulating forced air, as a rate and accumulated over a period of time.

At zero flow rate, sensing tip will lose a little heat to the air in the duct. This potential source of error is removed by a corrective circuit such as that in FIG. 8, which cancels the error arising at zero flow rate of the steam.

Several illustrative embodiments of this invention in its various aspects are described above and shown in the accompanying drawings. It is evident that various changes may be made, and the novel features may be rearranged and used in varied applications by those skilled in the art. Consequently, the invention should be construed broadly in accordance with its true spirit and scope.

What is claimed is:

1. Apparatus for providing a measurement of the energy in steam or the like converted from liquid to vapor by heating and transmitted to a vapor-condensing load, said apparatus including:
   i. a probe,
   ii. a vapor-supply conduit for the load, and
   iii. read-out means for providing a measure of the latent heat and other factors in be energy in the vapor flowing along the supply conduit,
   said probe including a heat transmitter that is elongated and includes a portion protruding inward into the supply conduit, at least a segment of the length of the heat transmitter being a linear thermal impedance of high thermal conductivity, a sensing tip constituting part of said heat transmitter and limited to a small portion of the inward protruding portion thereof, the comparatively much larger remainder of said inward protruding portion of the heat transmitter being covered with thermal insulation, said sensing tip being spaced substantially from the inner surface of the supply conduit and being exposed to the vapor in said conduit, a heat absorber at the end of the heat transmitter remote from the sensing tip, said heat absorber having at least such capacity and the heat transmitter having such limited thermal impedance and the sensing tip having such limited exposed area in relation to one another as to maintain the temperature of the sensing tip well below the condensation point of the vapor at the maximum rate of energy transmission and flow of vapor to be monitored, and first and second temperature sensors spaced apart along said linear thermal impedance, said second sensor being farther than said first sensor from the sensing tip,
   said sensros being connected to said read-out means for providing input representing the temperature difference between the sensors, and said read-out means being calibrated to provide a measure of energy trnasmission along the conduit.

2. Apparatus as in claim 1 wherein said sensing tip is part of said linear thermal impedance.

3. Apparatus as in claim 1 wherein said heat transmitter includes a further heat transmitting segment serially connected to said linear thermal impedance.

4. Apparatus as in claim 3 wherein said sensing tip is part of said linear impedance and wherein said further heat-transmitting segment is interposed between said linear thermal impedance and said heat absorber.

5. Apparatus as in claim 3 wherein said further heat transmitting segment is interposed between said sensing tip and said linear thermal impedance.

6. Apparatus as in claim 3 wherein said heat absorber is a passive heat dissipator.

7. Apparatus as in claim 4 wherein said heat absorber is a passive heat dissipator.

8. Apparatus as in claim 1 including thermal insulation covering the end portion of the heat transmitter at the innermost end of said inward protruding portion thereof, said sensing tip adjoining said end portion of the heat transmitter, a cavity being formed in said end portion of the heat transmitter, and at least part of said first temperature sensor being contained in said cavity.

9. Apparatus as in claim 1 wherein an innermost end portion of said heat transmitter constitutes said sensing tip, said first temperature sensor being mounted on the innermost end of said inward protruding portion of the heat transmitter and being covered by thermal insulation.

10. Apparatus as in claim 1 wherein said inward protruding portion of said heat transmitter is comprised of at least part of said linear thermal impedance of high thermal conductivity, the innermost end portion of the heat transmitter being covered by a portion of said thermal insulation and having a cavity formed therein, said sensing tip adjoining said innermost end portion of the heat transmitter, and at least part of said first thermal sensor being contained in said cavity.

11. Apparatus as in claim 1 wherein said inward protruding portion of said heat transmitter is comprised of at least part of said linear thermal impedance of high thermal conductivity, and wherein an innermost end portion of said heat transmitter constitutes said sensing tip, said first temperature sensor being mounted on the innermost end of said inward protruding portion of the heat transmitter and being covered by thermal insulation.

12. Apparatus as in any of claims 4 and 5 wherein said further heat transmitting segment is a heat pipe.

13. Apparatus as in any of claims 1 and 10 and 11 wherein said heat transmitter of the probe includes a heat pipe between said linear thermal impedance and said heat absorber.

14. Apparatus as in claim 13 wherein said heat absorber is a passive heat dissipator.

15. Apparatus as in either claim 6 or 7 wherein said further segment of said elongated heat transmitter is a heat pipe.

16. Apparatus as in claim 7 wherein said read-out includes means responsive to one of said sensors for modifying the response of the read-out to said temperature differenece for variably adjusting the operation thereof at various rates of fluid flow.

17. Apparatus as in claim 7 wherein said read-out includes a gain-controlled amplifier for variably modifying the response of the read-out to said sensors, one of said sensors being coupled in gain-control relation to said gain-controlled amplifier for modifying the output of the read-out as a function of the temperature of a portion of the probe.

18. Apparatus as in claim 1, further including a reference temperature sensor, and means responsive to said first sensor and said reference sensor for controlling the heat absorber for maintaining a constant relationship of the sensing tip's temperature to the reference temperature.

19. Apparatus as in claim 1, further including a reference temperature sensor for sensing the temperature of liquid in the system, and means responsive to said first sensor and said reference temperature sensor for controlling the heat absorber and for thereby maintaining the sensing tip's temperature essentially at the reference temperature.

20. Apparatus as in either claim 18 or 19 wherein said heat transmitter includes a heat pipe serially connected to said linear thermal impedance.

21. Apparatus as in claim 1 or 7, wherein the apparatus incorporates means for providing a representation of the temperature of the sensing tip and wherein said read-out includes means reponsive to said temperature representation means for off-setting the response of the read-out to said first and second sensors and thereby to provide correction for the absorption of heat by the sensing tip that occurs when the fluid flow is nil.

22. Apparatus as in claim 1 or 7, wherein the apparatus includes means providing a representation of the temperature of the fluid having one of said energy contents, and wherein said read-out includes a gain-controlled amplifier for modifying the response of the read-out to said sensors, said temperative-representation means being coupled in gain-control relation to said gain-controlled amplifier for modifying the output of the read-out as a function of the reference temperature representation.

23. Apparatus as in claim 1, including means responsive to the temperature of the sensing tip for variably modifying the response of the read-out at various flow rates.

24. Apparatus as in claim 1, wherein said read-out includes a gain-controlled amplifier, and means that is responsive to the temperature of the sensing tip and that is coupled in gain-control relationship to said gain-controlled amplifier for variably modifying the output of the read-out as a function of the temperature of the sensing tip.

25. Apparatus as in claim 1 in a system that additionally includes a second conduit for liquid that is to be converted to vapor for said vapor-supply conduit, a reference temperature sensor for sensing the temperature of the liquid in said second conduit, and means responsive to said first sensor and said reference temperature sensor for maintaining the sensing tip's temperature essentially at the temperature of the second conduit.

26. The method of measuring the energy supplied to a load at any rate within a range using as an energy-transfer medium steam or like fluid that changes state from liquid to vapor by heating, where such fluid, in common with steam, has a latent heat of condensation that is many times the specific heat of water, including the steps of exposing the sensing tip of a probe to flow of the vapor along a conduit to the load, the probe having an elongated heat transmitter with a sensing tip at one end, a linear thermal impedance forming at least part of the heat transmitter, and first and second temperature sensors spaced apart along the thermal impedance, cooling the sensing tip sufficiently to maintain the sensing tip well below the condensation temperature of the vapor throughout said range, and deriving a measure of the energy in said flow of vapor, including its latent heat of condensation, from the temperature difference of the sensors.

* * * * *